US010639955B2

(12) United States Patent
von Holst et al.

(10) Patent No.: US 10,639,955 B2
(45) Date of Patent: May 5, 2020

(54) SUSPENSION SYSTEM FOR A VEHICLE AXLE

(71) Applicants: Weber-Hydraulik GmbH, Guglingen (DE); Deere & Company, Moline, IL (US)

(72) Inventors: Christian A. von Holst, Hettenleidelheim (DE); Michael Kremb, Rockenhausen (DE); Tobias Hegler, Hassloch (DE); Jacek Zatrieb, Guglingen (DE)

(73) Assignees: Weber-Hydraulik GmbH, Güglingen (DE); Deere & Company, Moline, IL (US)

( * ) Notice: Subject to any disclaimer, the term of this patent is extended or adjusted under 35 U.S.C. 154(b) by 110 days.

(21) Appl. No.: 15/784,494

(22) Filed: Oct. 16, 2017

(65) Prior Publication Data

US 2018/0134107 A1    May 17, 2018

(30) Foreign Application Priority Data

Oct. 17, 2016 (DE) .................. 10 2016 119 714

(51) Int. Cl.
 *B60G 17/08*    (2006.01)
 *B60G 17/056*   (2006.01)
 *B60G 13/08*    (2006.01)

(52) U.S. Cl.
 CPC .......... *B60G 17/08* (2013.01); *B60G 13/08* (2013.01); *B60G 17/056* (2013.01);
 (Continued)

(58) Field of Classification Search
 CPC ...... B60G 17/08; B60G 13/08; B60G 17/056; B60G 2202/24; B60G 2800/162;
 (Continued)

(56) References Cited

U.S. PATENT DOCUMENTS 7,726,665 B2   6/2010   Bitter
9,174,509 B2   11/2015  Boge et al.
(Continued)

FOREIGN PATENT DOCUMENTS

CA   2528670   6/2007
DE   3226452   1/1984
(Continued)

*Primary Examiner* — Darlene P Condra
(74) *Attorney, Agent, or Firm* — Volpe and Koenig, P.C.

(57) ABSTRACT

A suspension system for a vehicle axle including at least one hydraulic suspension cylinder, which has at least one chamber, with the chamber being connected to a hydraulic accumulator and allowing a connection via switching arrangement as well as to a pressure source and a pressure release. A shut-off valve is arranged between the chamber and the accumulator, by which the suspension can be blocked. In order to avoid during the unblocking process that any sudden compensating motion of the axle suspension develops, here the suspension system includes at least one detection device connected to the chamber of the suspension cylinder and the accumulator, which is embodied to detect the pressure difference between the chamber and the accumulator. This way a pressure difference can be reliably detected at both sides of the shut-off valve, thus between the chamber of the suspension cylinder and the accumulator, and can be compensated in a targeted fashion during or before the opening of the shut-off valve for unblocking the suspension.

9 Claims, 3 Drawing Sheets

(52) U.S. Cl.
CPC .... *B60G 2202/24* (2013.01); *B60G 2300/022* (2013.01); *B60G 2300/06* (2013.01); *B60G 2400/50* (2013.01); *B60G 2400/51* (2013.01); *B60G 2500/10* (2013.01); *B60G 2500/30* (2013.01); *B60G 2800/162* (2013.01)

(58) Field of Classification Search
CPC ............ B60G 2500/10; B60G 2500/30; B60G 2400/50; B60G 2300/022; B60G 2300/06; B60G 2400/51
See application file for complete search history.

(56) References Cited

U.S. PATENT DOCUMENTS

| | | |
|---|---|---|
| 2005/0062239 A1 | 3/2005 | Shore |
| 2008/0100017 A1* | 5/2008 | Bitter ................ B60G 17/005 280/124.16 |
| 2014/0144130 A1* | 5/2014 | Vigholm ............. E02F 9/2207 60/327 |
| 2017/0151849 A1* | 6/2017 | Ohashi .............. B60G 17/0525 |
| 2018/0230669 A1* | 8/2018 | Stener ..................... F15B 11/17 |

FOREIGN PATENT DOCUMENTS

| | | |
|---|---|---|
| DE | 102005010297 | 10/2006 |
| DE | 102006051894 | 5/2008 |
| DE | 102012016457 | 2/2014 |
| EP | 1571267 | 9/2005 |
| EP | 2730438 | 5/2014 |

\* cited by examiner

SUSPENSION SYSTEM FOR A VEHICLE AXLE

INCORPORATION BY REFERENCE

The following documents are incorporated herein by reference as if fully set forth: German Patent Application No. 102016119714.9, filed Oct. 17, 2017.

BACKGROUND

The present invention relates to a suspension system for a vehicle axle with at least one hydraulic suspension cylinder, which comprises a chamber, with the chamber being connected to a hydraulic accumulator and capable to be optionally connected via shifting means to a pressure source and a pressure release, with a shut-off valve being arranged between the chamber and the accumulator, and with the suspension system comprising a detection device for detecting a pressure difference between the chamber and the accumulator.

Hydraulic and/or hydro-pneumatic axle suspension systems have been used for quite some time in vehicle construction of passenger vehicles; however they are also used increasingly in agricultural machines, particularly in modern tractors with a front axle suspension. Due to the different operating situations of agricultural machines with widely fluctuating axle loads such front axle suspensions are equipped with a level control and an adjustment of the intensity of the suspension. Furthermore, in certain operating conditions, for example when hoisting heavy loads via front loaders, a blockage of the front axle suspension must be possible.

A suspension system is described for example in the publication EP 2730438 A1 for an articulately supported vehicle axle with at least one hydraulic suspension cylinder that can be arranged between the vehicle axle and a carrying vehicle structure, which shows two chambers, which are respectively connected to different hydraulic accumulators.

Blocking such a suspension device can occur here in that a shut-off valve is arranged between the chamber and the hydraulic accumulator. If the hydraulic connection between the chamber and the accumulator is interrupted, here the elastic motion of the hydraulic cylinder is blocked by the incompressibility of the hydraulic medium used.

A disadvantage of such a blocking of the suspension system is the fact that upon release, thus when opening an appropriate shut-off valve between the chamber of the hydraulic cylinder and the accumulator, a compensating motion of the suspension occurs, depending on the load presently applied to the front axle, which can only be compensated to an insufficient extent by an automatic level control.

A hydro-pneumatic suspension system for wheel bearings is known from DE 32 26 452 C2, in which via a shut-off valve the accumulators of the suspension cylinder can be separated from the hydraulic accumulator connected via a connection line in order to block the suspension. A cross-over valve is installed in the connection line between the hydraulic accumulator and the suspension cylinder, which the hydraulic accumulator optionally connects to the connection line or to the pressure compensation valve. When the suspension is blocked and the vehicle is then to be returned to a suspended condition here the hydraulic accumulator is connected via the cross-over valve to the pressure compensation valve and the shut-off valve to the suspension cylinder is opened. Now a pressure difference—switch, connected to the connection line and the hydraulic accumulator, determines any potentially given pressure difference between the hydraulic accumulator and the hydraulic cylinder and opens the pressure compensation valve for such a period until the pressure in the hydraulic accumulator is adjusted to the one in the suspension cylinder. Subsequently the hydraulic accumulator is connected via the cross-over valve to the suspension cylinder. Here, the complexity of the hydraulic circuit and the successive addressing of several valves is disadvantageous, which renders the suspension system susceptible to malfunction. Additionally, the shut-off valve must be opened in case of any pressure difference given, which can also lead to a compensating motion based on a certain (although minor) compressibility of the hydraulic fluid in the suspension cylinder and the supply lines.

SUMMARY

Therefore the objective of the present invention is to provide a simpler suspension system for a vehicle axle in which compensating motions of the axle suspension can be avoided during the unblocking process.

This objective is attained using one or more features of the invention. Advantageous embodiments are described below and in the claims.

In a suspension system of the type mentioned at the outset the objective according to the invention is attained in that the detection device is constantly connected, in a parallel connection to the shut-off valve, to the suspension cylinder and the accumulator in order to detect a pressure difference between the chamber and the accumulator and to control the switching arrangement in order to adjust the pressure in the accumulator to the one of the chamber before opening the shut-off valve.

Due to the fact that the detection device is constantly connected, in a parallel connection to the shut-off valve, to the chamber of the suspension cylinder and the accumulator a pressure difference can be reliably detected at both sides of the shut-off valve, thus between the chamber of the suspension system and the accumulator, even when the shut-off valve is closed and compensated in a targeted faction before opening the shut-off valve. The compensation of a pressure difference can here occur once only briefly before opening the shut-off valve. Similarly it is also possible to continuously compensate pressure differences developing, thus constantly adjusting pressures in the accumulator to the alternating loads at the suspension cylinder. By the latter measure it is achieved that the shut-off valve can be opened at any point of time, at least however considerably faster than in the case of first requiring that pressure compensation needs to be performed.

The suspension system is beneficially equipped with a control unit, which for opening the shut-off valve addresses the switching arrangement depending on a pressure difference signal provided by the detection device, in order to adjust the pressure in the accumulator to the one of the chamber, and only after compensation has occurred, the shut-off valve is opened. In fact, by the accumulator being connected to the pressure source or the pressure release, depending on the direction of the pressure difference, according to the invention here a pressure difference detected by the detection device can be compensated even before the suspension is unblocked by opening the shut-off valve. This way any compensating motion of the suspended axle is avoided.

The detection device can be formed in a preferred embodiment of the invention via two pressure chambers and a displaceable member arranged between them, for example a piston arranged in an articulate fashion in a bore provided at both sides with pressure connections, with the two pressure chambers being impinged in a manner resulting in displacement on the one side with the pressure in the chamber of the cylinder, on the other side with the pressure in the accumulator. Depending on which side of the shut-off valve a higher pressure is given, the displaceable member is shifted in the one or the other direction and therefore serves as an indicator if the pressure in the accumulator must be increased or reduced in order to compensate a pressure difference given.

Here it is particularly provided that at least two pressure chambers inside the detection device are separated from each other by the displaceable member free from leakage. This way it is avoided that by the detection device any hydraulic medium flow around the shut-off valve and thus, in case of a pressure difference given, the deflection of the suspended axle changes in the blocked state, thus the front axle can be lowered or raised.

In an alternative embodiment the detection device comprises at least one additional pressure chamber, which is connected to the pressure release, for example a hydraulic medium reservoir. The additional pressure chamber can serve to detect a signal, proportional to the deflection and thus to the extent of the pressure difference, by another sensor allocated to the additional pressure chamber. The release of the additional pressure chamber towards the tank has the function, in case of a minor loss by leakage at the gaskets between the additional pressure chamber and the first and/or second pressure chamber, drain hydraulic medium into the tank. Additionally, it is not required here that the sensor, which is connected to the additional pressure chamber, is embodied in a pressure resistant fashion, which allows the use of cost-effective sensors.

It is therefore within the scope of the present invention that the detection device generates a binary pressure difference signal which indicates only the direction of a given pressure difference, as well as a constant pressure difference signal which is dependent on the intensity of a given pressure difference.

The detection device comprises beneficially in the embodiment described above also a sensor which detects the position of the displaceable member. The pressure difference signal generated by the sensor can be fed to the respective control unit and this way be used for an automatic compensation of the pressure difference before opening the shut-off valve. For example an inductive or capacitive proximity sensor or also a reed contact can be used as the sensor, here.

Furthermore it is advantageous for the detection device to have at least one spring, which rests on the displaceable member. Via such a spring, preferably via two springs arranged at both sides of the displaceable member, in a condition free from pressure differences and/or compensated pressure differences the displaceable member returns into a default position, for example a central position. Additionally, such a spring applies a return force upon the displaceable member, directed opposite the pressure difference and proportional to the deflection, so that the measurement of its deflection allows to determine the intensity of the pressure difference.

In one preferred embodiment the hydraulic reservoir is arranged between the shut-off valve and the switching arrangement, which optionally connect the accumulator to the pressure source or the pressure release. Using the switching arrangement, here in case of a closed shut-off valve, compensation can occur of any potential pressure difference given. If the switching arrangement is closed, i.e. the hydraulic connection between the accumulator and the pressure source and/or pressure release is interrupted the spring force of the suspension system presently adjusted via the pressure impingement of the accumulator remains constant.

Furthermore, within the scope of the present invention a hydraulic block is described for a suspension system of the above-mentioned type which comprises a hydraulic shut-off valve with a first and a second hydraulic connection and a detection device, constantly connected, in a parallel connection to the shut-off valve, to the first and the second hydraulic connection, for the continuous detection of a pressure difference between the first and the second hydraulic connection. Such a hydraulic block forms a robust and low-maintenance component for a suspension system of the type described above and can be installed between the suspension cylinder and the hydraulic accumulator.

Additionally, within the scope of the present invention a method is disclosed for blocking and unblocking a hydropneumatic suspension of a vehicle, with the suspension comprising at least one hydraulic suspension cylinder with at least one chamber, and in which the chamber can be connected to a hydraulic accumulator and via a switching arrangement optionally to a pressure source and a pressure release. The above-mentioned method is characterized in that for the purpose of blocking the suspension a shut-off valve is closed, arranged between the chamber and the accumulator, that when the shut-off valve is closed, a pressure difference is determined between the chamber and the accumulator via a detection device connected, in a parallel connection to the shut-off valve, constantly to the chamber of the suspension cylinder and the accumulator, the switching arrangement is controlled depending on the pressure difference determined, in order to compensate the pressure in the accumulator to the one in the chamber, and that in order to unblock the suspension of the shut-off valve (only) is opened after compensation has occurred.

While a signal for blocking the suspension system directly leads to block the shut-off valve, a signal for releasing the suspension system according to the invention initiates a chained process, starting with the adjustment of the pressure of the hydraulic accumulator to the pressure in the chamber of the suspension cylinder with the help of a pressure supply device.

This way, any sudden compensating movement of the axle suspension is avoided when unblocking the suspension system.

Preferably the adjustment of the pressures occurs such that the accumulator is connected by switching the switching arrangement via an actuator to the pressure source or to the pressure release, and via the pressure source and/or the pressure release the pressure difference is compensated.

The use of a detection device, comprising two pressure chambers and a displaceable member arranged between them, allows that the two pressure chambers are impinged on the one side with the pressure in the chamber of the cylinder, on the other side with the pressure in the accumulator in a manner that leads to displacement, an end of the compensation process of pressures can be detected in a particularly simple fashion by a sensor as a change in position of the displaceable member of the detection device.

BRIEF DESCRIPTION OF THE DRAWINGS

Additional advantages and features of the present invention are discernible from the following description of exemplary embodiments based on the drawings. Shown are.

DETAILED DESCRIPTION OF THE PREFERRED EMBODIMENTS

Figure 1:
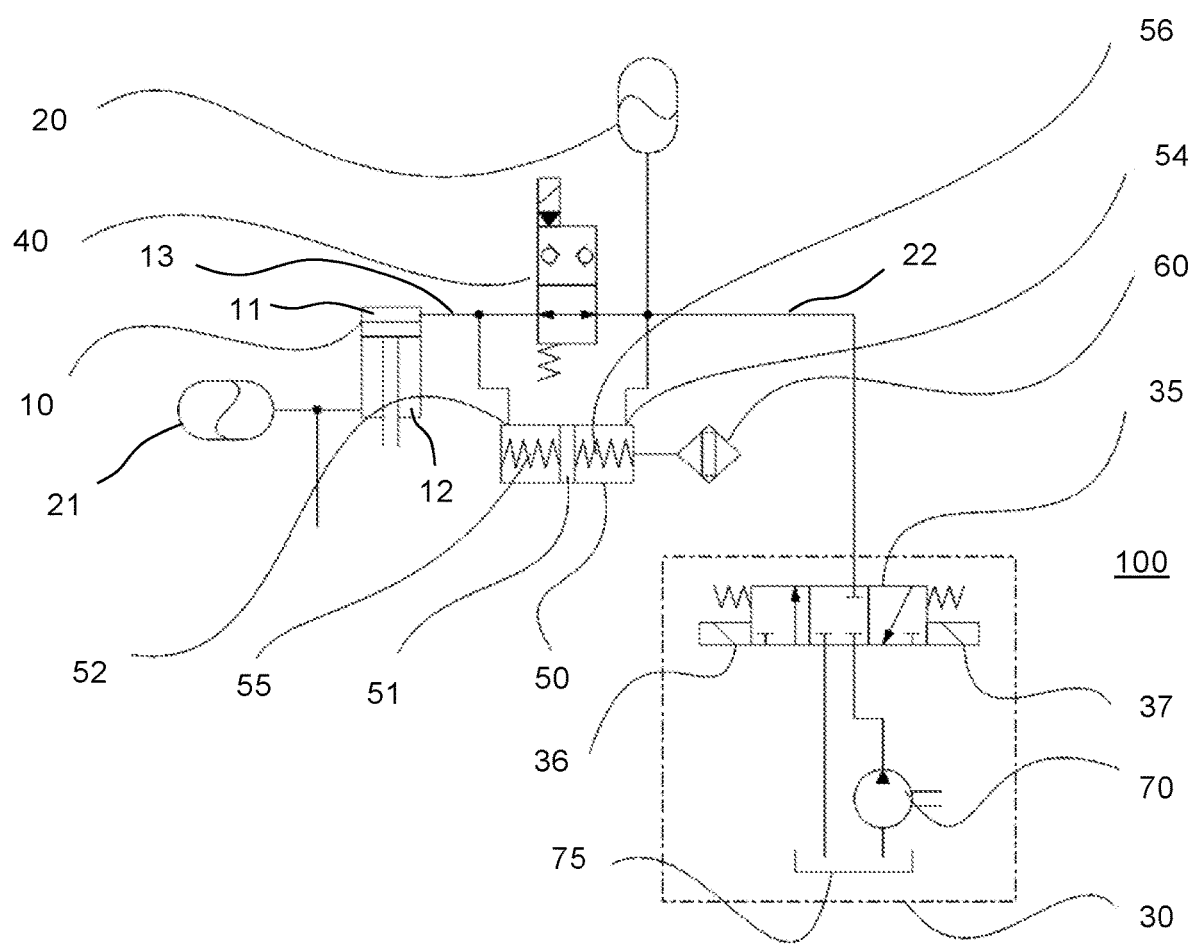
FIG. 1 a hydraulic diagram of connections of a hydropneumatic vehicle suspension with a shut-off valve and detection device according to the invention in a first exemplary embodiment, FIG. 2 a second exemplary embodiment of a suspension device according to the invention with an alternative detection device, and FIG. 3 a hydraulic block which can be used in a vehicle suspension according to the invention.

The suspension system shown in FIG. 1 comprises a hydraulic suspension cylinder 10, which is arranged for the suspension of a vehicle axle between said axle and a carrying vehicle structure. The vehicle axle, suspended in an articulate fashion in reference to the carrying vehicle structure, may represent for example a swing axle, particularly a suspended front axle of an agricultural tractor. Here it may be provided in particular that each of the two sides of the swing axle is allocated to a separate hydraulic suspension cylinder 10 such that upon any motion of the swing axle the hydraulic suspension cylinders are deflected inwardly and/or outwardly in the opposite direction. Here it shall be noted that the suspension system according to the invention is not limited to the use for a swing axle. Rather, it can also be used in the context with an independent suspension system or other axle geometries.

The suspension cylinder 10 shown in FIG. 1 as an example comprises an upper chamber 11 and a lower chamber 12, which are separated in a fluid-tight fashion via a longitudinally mobile piston. A piston rod carried by the piston projects through the lower chamber 12 out of the suspension cylinder 10 and, upon displacement of the piston, it can be inserted in and/or extracted from the suspension cylinder 10. The lower chamber 12 is accordingly embodied as an annular chamber and sealed in reference to the piston rod in a conventional fashion at its lower cylinder head via a step seal.

The chamber 11 of the hydraulic cylinder, primarily of interest within the scope of the present invention, is connected via a hydraulic line 13 and a shut-off valve 40 to a hydraulic accumulator, for example a hydro-membrane reservoir 20 filled with nitrogen. When the piston rod elastically enters the suspension cylinder 10, the hydraulic fluid is displaced from the chamber 11 and flows under compression of the here contained gaseous medium into the accumulator 20. The suspension cylinder 10 forms therefore, together with the hydraulic accumulator 20, a gas pressure spring, by which the above-mentioned vehicle axle is suspended.

Additionally, the lower chamber 12 can also be connected to an additional hydraulic accumulator 21. This way the suspension system can be biased. By adjusting the pressure in the upper chamber 11 and/or the lower chamber 12 the level of the carrying vehicle structure in reference to the ground and the resilience of the suspension device can be influenced in a targeted fashion and dynamically adjusted to the operating condition.

Within the scope of the present invention it is essential on the one hand that the hydraulic connection 13 between the chamber 11 and the hydraulic accumulator 20 can be interrupted by the shut-off valve 40. Due to the fact that the hydraulic medium (hydraulic oil) present in the chamber 11 cannot be compressed, in this case the piston rod cannot any longer elastically penetrate into the suspension cylinder 10; the suspension system is therefore deactivated.

Such a blockage of the front axle suspension in agricultural equipment, such as a tractor, may be beneficial and necessary in various operating situations. For example, when via a front loader mounted at a tractor a heavy load is to be hoisted, this way it can be prevented that the suspension system of the front axle gives way and therefore the tractor tilts down towards the front under the hoisted load.

Additionally, a hydraulic supply unit 30 is connected to the hydraulic accumulator 20 via an appropriate hydraulic line 22. It comprises a hydraulic pump 70, which serves as a pressure source, a hydraulic medium tank 75, which serves as a pressure release, and a 3/3-way valve 35 arranged between the hydraulic line 22 on the one side and the hydraulic pump 70 and the hydraulic medium tank 75 at the other side, which is switched via appropriate actuators 36, 37, for example magnetic coils. Using the 3/3-way valve 35 here the hydraulic medium line 22, in the central position of the valve 35, can optionally be decoupled from the supply device 30 and shut-off, in the right valve position be connected to the hydraulic medium tank 75, and in the left valve position be connected to the hydraulic pump 70. Via the supply device 30 the pressure in the hydraulic reservoir 20 and thus in the chamber 11 of the suspension cylinder can be changed, in order to regulate the level and resilience of the suspended vehicle axle.

In the same way as the chambers 11, the annular chamber (annular chamber) 12 of the suspension cylinder 30 can be connected via an appropriate multi-way valve to the supply unit 30 or a separate supply device in order to allow also changing the pressure in the chamber 12 and/or the accumulator 21 connected thereto and thus changing the bias of the suspension cylinder 10 in a manner known per se. A respective hydraulic line for the connection to a supply unit is here only indicated.

According to another aspect of the present invention additionally a detection device 50 is provided, by which a pressure difference between the chamber 11 of the suspension system 10 and the accumulator 20 can be detected. Such a pressure difference can occur when in the closed state of the shut-off valve 40, thus when the suspension system is blocked, the load applied to the corresponding front axle changes, for example by fastening an attachment, hoisting or lowering a load with the front loader attached to the tractor, or the like. For this purpose the detection device 50 comprises a first pressure chamber 52, which is connected to the hydraulic line 13, and a second pressure chamber 54, which is connected to the hydraulic line 22. In other words, the detection device 50 is connected upstream and downstream in reference to the shut-off valve 40. Here it is essential that the detection device is therefore constantly, particularly without any additional valves being interposed and in every switching status of the shut-off valve 40, connected to the chamber 11 of the suspension cylinder 10 and the accumulator 20.

A displaceable piston 51 is located between the two pressure chambers 52, 54, which in the unpressurized state is held in a central position via springs 55, 56 arranged at both sides. When the shut-off valve 40 is blocked and a pressure difference develops between the chamber 11 and the accumulator 20 the piston 51 is displaced towards the right or the left depending on the pressure difference. The position of the piston 51 can be detected via a sensor 60 connected to the detection device 50 and this way the pressure difference can be determined, at least with regards to the algebraic sign.

The sensor 60 may represent a sensor operating in a touchless fashion. In general, the sensor 60 can be embodied in any arbitrary fashion. Pressure-resistant proximity sensors are particularly suited, which operate in an inductive or capacitive fashion, thus detect any approach of the piston 51 by changing inductivity or capacitance.

The signal generated by the sensor 60 is fed to a control unit, which operates the suspension system. The control unit ensures now that, before the shut-off valve 40 is opened, any potentially given pressure difference between the chamber 11 and the hydraulic accumulator 20 is at least approximately compensated via the supply device 30. For this purpose, depending on the pressure inside the accumulator 20 being greater or lower than the one in the chamber 11, the 3/3-way valve 35 is adjusted by the control unit such that the accumulator 20 is either connected to the hydraulic medium tank 75 in order to reduce the pressure in the hydraulic reservoir 20 or connected to the hydraulic pump 70 in order to increase the pressure, namely until the detection device 50 indicates that the pressure difference between the hydraulic reservoir 20 and the chamber 11 is at least adjusted to be within predetermined limits. Subsequently the shut-off valve 40 can be opened in order to unblock the suspension system. This way it is avoided that the front axle suspension performs a compensating motion during the unblocking process, thus the carrying vehicle structure either gives way or is raised by the suspension system.

The two pressure chambers 52, 54 can be easily embodied as a bore in which appropriate hydraulic connections end at both sides, and into which the mobile pin or piston 51 is inserted in a sealed fashion. The piston 51 can for example be sealed via a soft-elastic gasket in the above-mentioned bore 52, 53.

When the pressure in the chamber 11 is higher than the one in the accumulator 20, the piston is shifted towards the right. When the pressure in the chamber 11 is however lower than the one in the accumulator 20 the piston is shifted towards the left. The sensor 60 therefore needs to detect only the position of the piston 51 at one side of the bore 52, 54. Depending on the piston 51 being located at the left or the right, before opening the shut-off valve 40, the accumulator is connected to the hydraulic medium tank 75 or to the hydraulic pump 70, namely until the piston 51 moves into the opposite direction. At this moment the pressure is compensated and the 3/3-way valve 35 is closed. In the simplest case, the sensor 60 only needs to detect a change of the position of the piston 51. The position of the piston 51 represents here the algebraic sign of the pressure difference, thus a binary signal for a pressure difference, and the knowledge thereof is sufficient for a pressure adjustment, in the simplest case. In this case the springs 55, 56 can be waived.

The detection device 50 can however, in a further development of the invention, determine in addition to the mere algebraic sign of a potential pressure difference between the chamber 11 and the accumulator 20, additionally the intensity of the pressure difference given, using the deflection of the piston 51. This information can be processed in the corresponding control unit in order to determine for example the switching times for the 3/3-way valve 35, within which the pressure difference shall be perhaps compensated.

Figure 2:
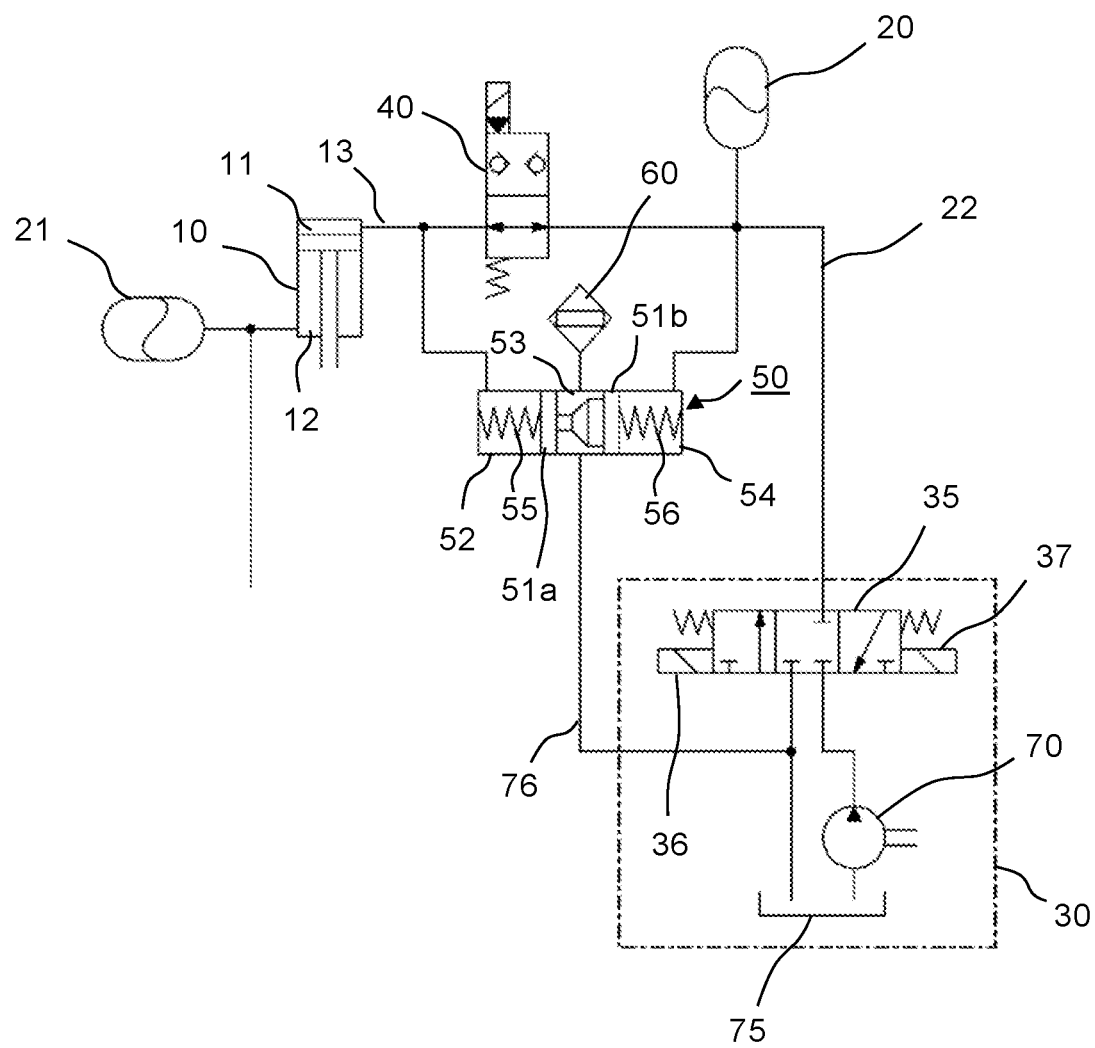

FIG. 2 shows schematically a second exemplary embodiment of the suspension system according to the invention. Here, identical and equivalent components are marked with the same reference characters as in FIG. 1. The detection device 50 in the second exemplary embodiment differs from the first exemplary embodiment such that a third pressure chamber 53 is arranged between the left pressure chamber 52 and the right pressure chamber 54, which via a hydraulic line 76 is connected to the hydraulic medium tank 75 and/or is released.

The left pressure chamber 52 is separated from the central pressure chamber 53 by a first piston 51a. The first pressure chamber 54 is accordingly separated from the central pressure chamber 53 by a second piston 51b. A stiff spacer is arranged between the pistons 51a, 52b, which conically widens from the left towards the right. Unlike the first exemplary embodiment, in which the sensor 60 is connected to the right pressure chamber 54, the sensor 60 is here connected to the central pressure chamber 53. This is advantageous in that the sensor 60 is not required to be pressure-resistant since the pressure chamber 53 is released towards the tank 53.

The function of the conically shaped spacer between the pistons 51a, 52b comprises that via the proximity sensor 60, which reacts to the presence and/or proximity of ferromagnetic or electrically conductive materials, a signal can be generated that is proportional to the deflection. The release of the pressure chamber 53 towards the tank 75 serves additionally, for merely precautionary reasons, to drain hydraulic medium into the tank 75 in case of minor leaks at the pistons 51a, 52b.

Figure 3:
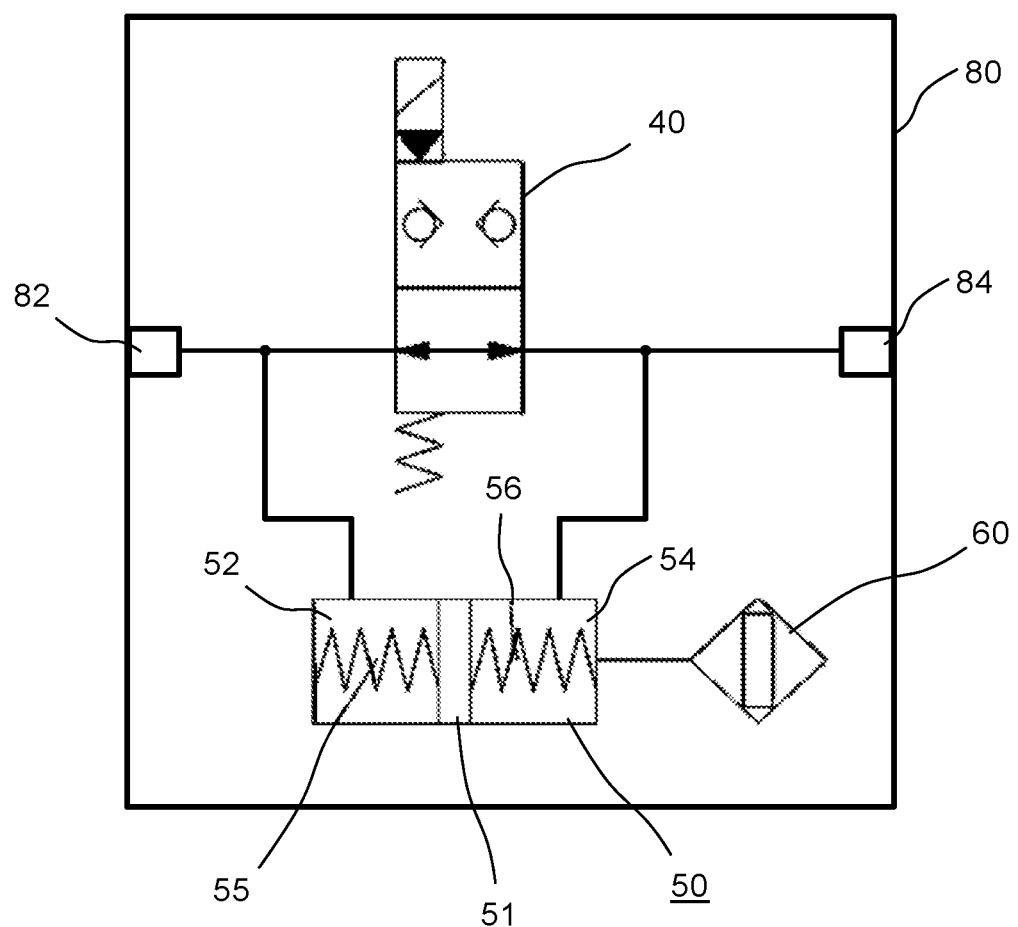

FIG. 3 shows a hydraulic block 80, which is provided for the use in a hydraulic suspension system. The hydraulic block comprises the shut-off valve 40 and the detection device 50 to detect a pressure difference given at both sides of the blocked shut-off valve 40. The shut-off valve 40 and the detection device 50 are connected in a parallel connection between two hydraulic connections 82, 84 of the hydraulic block 80 in a fluid-conducting fashion. At the right pressure chamber 54, similar to FIG. 1, the proximity sensor 60 is connected, which detects the position of the mobile piston 51 inside a bore, which forms the pressure chambers 52, 54.

In the above-stated exemplary embodiments the invention was described based on only one suspension cylinder. Similarly, however the pressure difference can also be monitored and detected at several suspension cylinders and corresponding accumulators. In this case the blocked suspension can only be released when compensation of the respective pressure difference has occurred at all suspension cylinders.

The invention claimed is:

1. A suspension system for a vehicle axle, comprising: at least one hydraulic suspension cylinder (10) having at least one chamber (11), with the chamber (11) being connected to a hydraulic accumulator (20) and being connectable to a pressure source (70) and a pressure release (75), a shut-off valve (40) arranged between the chamber (11) and the accumulator (20), a detection device (50) for detecting a pressure difference between the chamber (11) and the accumulator (20), the detection device (50) is constantly connected via a parallel connection to the shut-off valve (40) to the chamber (11) of the suspension cylinder (10) and the accumulator (20) in order to detect a pressure difference between the chamber (11) and the accumulator (20), and the detection device provides a signal that controls a switching arrangement (35), before opening the shut-off valve (40), to adjust a pressure in the accumulator (20) to the one of the chamber (11), and a control unit, which before opening the shut-off valve (40) controls the switching arrangement (35) depending on the pressure difference signal provided by the detection device (50) in order to adjust the pressure in the accumulator (20) to the pressure in the chamber (11) and, only upon compensation having occurred, opens the shut-off valve (40).

2. The suspension system according to claim 1, wherein the hydraulic accumulator (20) is arranged between the shut-off valve (40) and the switching arrangement (35).

3. A suspension system for a vehicle axle, comprising: at least one hydraulic suspension cylinder (10) having at least one chamber (11), with the chamber (11) being connected to a hydraulic accumulator (20) and being connectable to a pressure source (70) and a pressure release (75), a shut-off valve (40) arranged between the chamber (11) and the accumulator (20), a detection device (50) for detecting a pressure difference between the chamber (11) and the accumulator (20), the detection device (50) is constantly connected via a parallel connection to the shut-off valve (40) to the chamber (11) of the suspension cylinder (10) and the accumulator (20) in order to detect a pressure difference between the chamber (11) and the accumulator (20), and the detection device provides a signal that controls a switching arrangement (35), before opening the shut-off valve (40), to adjust a pressure in the accumulator (20) to the one of the chamber (11), and the detection device (50) comprises two pressure chambers (52, 54) and a displaceable member (51) arranged between them, with the two pressure chamber (52, 54) being impinged on the one side with the pressure in the chamber (11) of the suspension cylinder (10) and on the other side with the pressure in the accumulator (20) in a manner that generates displacements of the displaceable member.

4. The suspension system according to claim 3, wherein the two pressure chambers (52, 54) are separated from each other in a leak-free fashion inside the detection device (50) from the displaceable member (51).

5. The suspension system according to claim 4, wherein the detection device (50) comprises at least one additional pressure chamber (53) which is connected to the pressure release (75).

6. The suspension system according to claim 5, wherein the detection device (50) comprises a sensor (60) that detects a position of the displaceable member (51).

7. The suspension system according to claim 3, wherein the detection device (50) comprises at least one spring (55, 56) which is supported on the displaceable member (51).

8. A hydraulic block (80) for a suspension system, the suspension system comprising for a vehicle axle, comprising: at least one hydraulic suspension cylinder (10) having at least one chamber (11), with the chamber (11) being connected to a hydraulic accumulator (20) and being connectable to a pressure source (70) and a pressure release (75), a shut-off valve (40) arranged between the chamber (11) and the accumulator (20), a detection device (50) for detecting a pressure difference between the chamber (11) and the accumulator (20), the detection device (50) is constantly connected via a parallel connection to the shut-off valve (40) to the chamber (11) of the suspension cylinder (10) and the accumulator (20) in order to detect a pressure difference between the chamber (11) and the accumulator (20), and the detection device provides a signal that controls a switching arrangement (35), before opening the shut-off valve (40), to adjust a pressure in the accumulator (20) to the one of the chamber (11), the hydraulic shut-off valve (40) includes a first and a second hydraulic connection (82, 84) and the detection device (50) is connected, in a parallel connection to the shut-off valve, to the first and the second hydraulic connection (82, 84) for the constant detection of a pressure difference between the first and the second hydraulic connection (82, 84).

9. A method for blocking and unblocking a hydro-pneumatic suspension of a vehicle, the hydro-pneumatic suspension comprises at least one hydraulic suspension cylinder (10) with at least one chamber (11), and with the chamber (11) being connected to a hydraulic accumulator (20), which is connectable via a switching arrangement (35) to a pressure source (70) and a pressure release (75), the method comprising closing a shut-off valve (40) for blocking the suspension, the shut-off valve (40) being arranged between the chamber (11) and the accumulator (20), and when the shut-off valve (40) is closed, determining a pressure difference via a detection device (50) constantly connected to the chamber (11) of the suspension cylinder (10) and the accumulator (20), connected parallel to the shut-off valve (40), between the chamber (11) and accumulator (20), controlling the switching arrangement (35) depending on the pressure difference determined, in order to adjust the pressure in the accumulator (20) to the one of the chamber (11), and for unlocking the suspension, opening the shut-off valve (40) after the adjustment has occurred, wherein the detection device (50) comprises two pressure chambers (52, 54) and a displaceable member (51) arranged between them, with the two pressure chambers (52, 54) being impinged on one side with the pressure in the chamber (11) of the suspension cylinder (10) and on an other side with the pressure in the accumulator (20) in a manner causing displacement, and the method further comprising detecting an end of the adjustment process of the pressures by a sensor (60) based on a change in position of the displaceable member (51) of the detection device (50).

* * * * *